United States Patent
Tomkins et al.

(10) Patent No.: US 9,875,297 B2
(45) Date of Patent: *Jan. 23, 2018

(54) ASSOCIATING A TASK WITH A USER BASED ON USER SELECTION OF A QUERY SUGGESTION

(71) Applicant: Google Inc., Mountain View, CA (US)

(72) Inventors: Andrew Tomkins, Menlo Park, CA (US); Tristan Harris, Los Gatos, CA (US); Can Sar, Mountain View, CA (US); Angelo DiNardi, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,341

(22) Filed: Oct. 4, 2016

(65) Prior Publication Data

US 2017/0024398 A1 Jan. 26, 2017

Related U.S. Application Data

(63) Continuation of application No. 14/065,081, filed on Oct. 28, 2013, now Pat. No. 9,483,565.

(60) Provisional application No. 61/840,366, filed on Jun. 27, 2013.

(51) Int. Cl.
*G06F 17/30* (2006.01)

(52) U.S. Cl.
CPC .... *G06F 17/3064* (2013.01); *G06F 17/30867* (2013.01)

(58) Field of Classification Search
None
See application file for complete search history.

(56) References Cited

U.S. PATENT DOCUMENTS

| | | |
|---|---|---|
| 5,603,054 A | 2/1997 | Theimer et al. |
| 6,842,877 B2 | 1/2005 | Robarts et al. |
| 7,496,500 B2 | 2/2009 | Reed et al. |
| 8,055,707 B2 | 11/2011 | Desai et al. |
| 8,108,206 B2 | 1/2012 | Hufnagel et al. |
| 8,364,467 B1 | 1/2013 | Bowman et al. |
| 8,375,099 B2 | 2/2013 | Carroll et al. |
| 8,417,650 B2 | 4/2013 | Graepel et al. |
| 8,473,485 B2 | 6/2013 | Wong et al. |
| 8,521,818 B2 | 8/2013 | McGann et al. |
| 8,560,487 B2 | 10/2013 | Jhoney et al. |
| 8,599,801 B2 | 12/2013 | Baio et al. |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Amresh Singh
(74) *Attorney, Agent, or Firm* — Middleton Reutlinger

(57) ABSTRACT

Methods and apparatus related to associating a task with a user based on the user selecting a task suggestion that is provided to the user in response to a user query. In some implementations, the task may be identified based on similarities between the words and/or phrases of the user query and a task suggestion that is associated with a task. In some implementations, the task may be identified based on user data associated with the user. In some implementations, the task may be associated with additional information related to completing the task.

16 Claims, 7 Drawing Sheets

(56) References Cited

U.S. PATENT DOCUMENTS

| | | |
|---|---|---|
| 8,706,748 B2 | 4/2014 | Herlocker et al. |
| 2007/0050339 A1 | 3/2007 | Kasperski et al. |
| 2009/0157617 A1 | 6/2009 | Herlocker et al. |
| 2009/0193099 A1 | 7/2009 | Patridge |
| 2009/0307212 A1 | 12/2009 | Ramot et al. |
| 2012/0150532 A1 | 6/2012 | Mirowski et al. |
| 2012/0239761 A1 | 9/2012 | Linner et al. |
| 2012/0317499 A1 | 12/2012 | Shen |
| 2012/0323948 A1 | 12/2012 | Li et al. |
| 2012/0331036 A1 | 12/2012 | Duan et al. |
| 2013/0006952 A1 | 1/2013 | Wong et al. |
| 2013/0073662 A1 | 3/2013 | Meunier et al. |
| 2013/0159270 A1 | 6/2013 | Urmy et al. |
| 2013/0297551 A1 | 11/2013 | Smith et al. |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

International Search Report and Written Opinion of PCT Serial No. PCT/US14/44189, dated Nov. 3, 2014.

```
                    Create Appointment Task?

Date:    [                    ]

Start Time:    [                    ]

End Time:    [                    ]

Location:    [                    ]

[ Create Task ]      [ Cancel ]
```

ASSOCIATING A TASK WITH A USER BASED ON USER SELECTION OF A QUERY SUGGESTION

BACKGROUND

This specification is directed generally to providing a user with a task suggestion in response to a query and associating a task with the user when the user selects the task suggestion.

A user may sometimes utilize a search engine to locate information regarding a task that requires completion. For example, a user may search for information regarding booking a flight in anticipation of needing to do so in the future. A user may additionally and/or alternatively utilize other applications to locate information and/or to store information related to the task.

SUMMARY

The present disclosure is directed to methods and apparatus for identifying a query from a user and providing a suggestion for the query that is a task suggestion related to a task. The user may be associated with the task when the user selects the task suggestion. In some implementations, tasks may be identified based on one or more terms of the query. In some implementations, tasks may be identified based on data that is associated with the user. In some implementations, additional information related to completing a task may be associated with the task.

In some implementations, a method is provided and include the steps of: identifying a query of a user; identifying a plurality of suggestions for the query, the suggestions including at least one task suggestion associated with at least one task; providing one or more of the suggestions to the user, the provided suggestions including the task suggestion associated with the at least one task; receiving a user selection of the task suggestion; and associating the at least one task with the user in response to receiving the user selection of the task suggestion.

This method and other implementations of technology disclosed herein may each optionally include one or more of the following features.

The method may further include the step of providing an indication of the at least one task in combination with providing the task suggestion to the user. The user selection of the task suggestion may be a user selection of the indication of the at least one task.

The method may further include the step of identifying a task type, wherein the indication of the at least one task is based on the task type. The indication of the at least one task may be a graphical indication of the task type.

The method may further include the step of determining the at least one task associated with the task suggestion. The task may be determined based on one or more terms of the task suggestion. The task may be determined based on user data associated with the user. The user data may include at least one of user contacts, user webpage navigation history, and user e-mails.

The method may further include the step of generating the task suggestion based on user data associated with the user. The task may be based on user data associated with the user.

The method may further include the steps of: determining additional information related to completion of the task; and associating the additional information with the task. The method may further include the step of identifying a task type for the task, and determining the additional information related to completion of the task may be based on the identified task type. The additional information may be based on user data associated with the user. The user data may include at least one of user contacts, user webpage navigation history, and user e-mails.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein associate one or more tasks with a user based on a selection of a query suggestion by the user, wherein the query suggestion is associated with the one or more tasks. These tasks represent actions that may be taken by the user. The tasks may be based on terms of the query suggestion and/or may additionally be identified based on information associated with the user. Particular implementations of the subject matter described herein may further associate additional information related to completing a task with the task based on user input and/or one or more additional sources.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
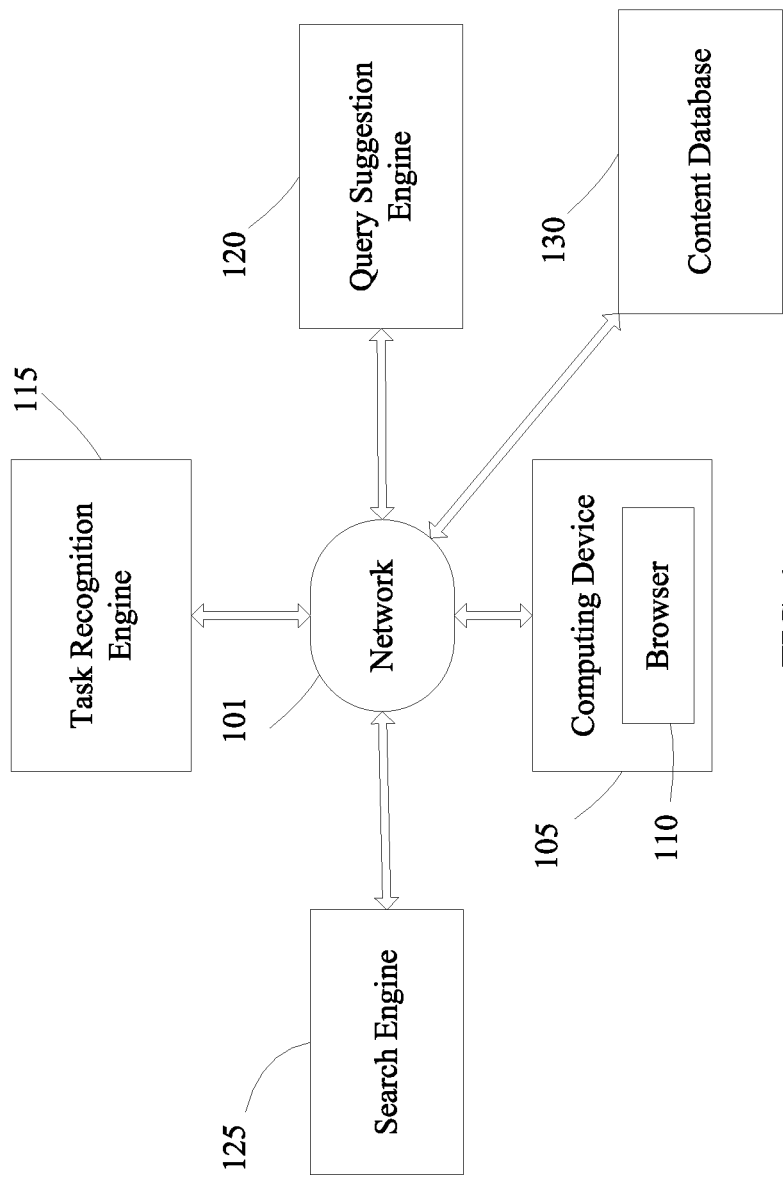
FIG. 1 is a block diagram of an example environment in which implementations of a method of associating tasks with a user based on a user selecting a task suggestion may be implemented.

In some implementations, a user may utilize one or more applications to submit a query to record and/or locate information regarding one or more tasks that the user may have interest in completing. For example, a user may use a search engine to submit the query "pay my cell phone bill" to locate information regarding the process of paying a cellular telephone bill and/or to store information related to the process, such as storing "pay my cell phone bill" as a reminder in a calendar application. Also, for example, a user may submit the search query "flight information" to locate information about future flights. The user may be provided one or more query suggestions that share one or more aspects with the submitted query of the user. The provided query suggestions may include one or more task suggestions. A task suggestion is a query suggestion that is associated with a task. For example, a query suggestion may be associated with the task of paying a cellular telephone bill, and/or the task of booking airline flights, based on the user submitting the example queries.

In some implementations, a query suggestion may be an auto complete suggestion for a partial query of the user. For example, the user may enter the partial query "pa" and query suggestions that are auto complete suggestions for the partial query may be provided to the user, such as "pay my cell phone bill." The provided query suggestion may include one or more task suggestions. A task suggestion may be based on the partial query of the user and may be associated with a task. For example, the partial query "pa" may result in a provided task suggestion "pay my cell phone bill" associated with a task for the user to pay a cellular phone bill.

In some implementations, a task may be a representation of a future event and/or an intended action. For example, a task may be an appointment that will occur in the future. Also, for example, a task may be associated with a transaction to be completed. Examples of tasks may include, for example, paying a bill, making a reservation, arriving at and/or departing from a location, and/or purchasing an item.

In some implementations, a task may be categorized with a task type. A task type may be descriptive of the requirements to perform a task and/or the purpose for the task. For example, a task may be related to paying a cellular phone bill. The task may be categorized as a reminder task because the task may be to remind a user to pay a bill, and/or the task may be categorized as a purchase task because the task may be to purchase a product and/or service. Other examples of task types may include event tasks, appointment tasks, and/or search query tasks.

In some implementations, a task may be associated with additional information pertaining to the completion of the task. For example, a task may be to reserve an airline flight for an upcoming trip. Additionally, the task may be associated with flight times, destinations, airline information, and/or the purpose of the trip. In some implementations, additional information about a task may be associated with a task based on input of a user. For example, in some implementations, the additional information about a task may be identified from one or more additional sources, such as user-created and/or user-edited documents. In some implementations, the query that was provided by the user may include additional information about a task. For example, a flight booking task that is associated with a task suggestion that is provided to the user based on the user entering the query "flights LAX" may be further associated with additional information based on the presence of the airport designation "LAX" in the query, such as the location of the airport and specific flight information about the airport. In some implementations, additional information about a task may be identified from one or more additional databases, such as an entity database.

In some implementations, entities are topics of discourse. In some implementations, entities are persons, places, concepts, and/or things that can be referred to by a text fragment (e.g., a term or phrase) and are distinguishable from one another (e.g., based on context). For example, the text "bush" in a query or on a webpage may potentially refer to multiple entities such as President George Herbert Walker Bush, President George Walker Bush, a shrub, and the rock band Bush. In some implementations, an entity may be referenced by a unique entity identifier that may be used to identify the entity. The unique entity identifier may be associated with one or more properties associated with the entity and/or with other entities. For example, in some implementations one or more entity database may include properties associated with unique identifiers of one or more entities. For example, for each of a plurality of entities, a mapping (e.g., data defining an association) between the entities and one or more properties and/or other entities related with the entity may be identified in the entity database. For example, a unique identifier for the entity associated with "LAX" may be associated with a name or alias property of "LAX," another alias property of "Los Angeles International Airport" (an alternative name by which LAX is often referenced), a phone number property, an address property, and/or an entity type property of "airport" in the entity properties database. Additional and/or alternative properties may be associated with an entity in one or more databases such as an entity database. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

Referring to FIG. 1, a block diagram is illustrated of an example environment in which implementations of a method of associating tasks with a user based on a user selecting task suggestions may be implemented. The environment includes a computing device 105 with a web browser 110, a search engine 125, a query suggestion engine 120, a task recognition engine 115, and a content database 130. The environment also includes a communication network 101 that enables communication between various components of the environment.

The computing device 105 executes one or more applications, such as web browsers (e.g., web browser 110), that enable the user to formulate queries and submit completed queries to the search engine 125. In some implementations, queries may be submitted directly to the search engine 125 from the computing device 105. In some implementations, completed queries may be submitted from the query suggestion engine 120 to the search engine 125. In some implementations, queries may be additionally and/or alternatively submitted to other engines, such as those discussed herein. For example, a query may be submitted to task recognition engine 115 to associate a task with a user based on one or more terms in the query.

In some implementations, a query is one or more terms that a user may submit to an engine to request one or more results. In some implementations, the engine may be a search engine that shares one or more aspects with search engine 125. In some implementations, the search engine 125 may be an internet search engine and may provide one or more web-based documents in response to a query. In some implementations, a query may be submitted to a non-search engine application and the user may be provided with one or more options and/or documents that are specific to that application in response to the submission of a query. For example, the user may submit "go to gym" to a query entry interface of a calendar application and the user may be provided with an option to create a reminder task to go to the gym and/or the user may be provided with an existing reminder and/or appointment task to go to the gym that has been previously submitted to the calendar application.

In some implementations, a partial query may be submitted to a query completion engine and one or more query suggestions may be provided to the user in response to the partial query. In some implementations, a user may indicate a completed query by entering a carriage return and/or other character. In some implementations, a user may indicate a completed query by selecting a search button or other submission button in a user interface presented to the user. In some implementations, a user may indicate a completed query by speaking a command in a speech user interface. In some implementations, a user may indicate a completed query by pausing more than a predetermined amount of time during entering of the query. In some implementations, an application may provide query suggestion engine 120 with partial queries for each character of a query as it is typed or otherwise entered by the user. In some implementations, an application may provide multiple characters at a time, optionally following a pause by the user between character entries.

In some implementations, multiple query suggestions may be included in a single search query (e.g., prior to a user indication that the search query is complete). For example, a user interface of the computing device 105 may allow a user to select multiple query suggestions in succession, allowing the user to build a search query one word or one phrase at a time. A phrase can include one or more words. When the user selects multiple query suggestions, the query can include each of the selected query selections in the sequence that they were selected. After each selection of a query suggestion, the computing device 105 configures a user interface to receive additional query content rather than indicating a completed query in response to user selection of a query suggestion.

As an example, when a user selects a query suggestion, the selected query suggestion is added to the partial query, forming an extended query. The computing device 105 then presents new query suggestions for the extended query. By selecting one of the new query suggestions, the user can add it to the extended query, and can continue to add additional query suggestions (or other input) until the user indicates that the query is complete.

In some implementations, one or more query suggestions may be provided to the user in response to the user entering a partial query. The query suggestion may be, for example, one or more terms that are responsive to the terms that were entered by the user and one or more additional terms that may be likely completions to the partial query that has been entered by the user. For example, the user may enter "pay my c" and be provided with one or more query completion suggestions, such as "pay my cell phone bill" and "pay my credit card." In some implementations, the query suggestion may be associated with a task and the user may select the query suggestion to associate the task with the user. In some implementations, the query suggestion may be selected by the user and submitted to a search engine to identify one or more webpages that may include content that is related to the query. In some implementations, the query suggestion that is selected by the user may be submitted to an application and the user may be provided with content from the application and/or further action that may be taken by the user based on the selected query suggestion. For example, a user may submit the partial query "remind me to go to" into a query submission interface of a calendar application and be provided with a list of query suggestions that includes "remind me to go to the gym" and "remind me to go to the doctor." By selecting one of the query suggestions, a task may be associated with the user and/or a reminder may be added to a calendar in the calendar application.

In some implementations, a user may interact with the search engine 125 through a web browser 110 on a client computing device 105. The computing device 105 may be, for example, a desktop computer, a laptop computer, a cellular phone, a smartphone, a personal digital assistant (PDA), a tablet computer, a wearable computing device (e.g., a digital watch, earpiece, glasses), a navigation system, and/or another computing device. The computing device 105 and the search engine 125 each include memory for storage of data and software applications, a processor for accessing data and executing applications, and components that facilitate communication over a communication network 101. The operations performed by the client computing device 105, the browser 110, and/or the search engine 125 may be distributed across multiple computer systems.

The search engine 125 receives a query and executes the query against a search engine content database (e.g., content database 130) of available documents such as web pages, images, text documents, and/or multimedia. For the purposes of this specification, a document is any data that is associated with a document address. Documents include webpages, word processing documents, portable document format (PDF) documents, images, video, audio, e-mails, calendar entries, task entries, and feed sources, to name just a few. The documents may include content such as, for example, words, phrases, pictures, audio, task identifiers, entity identifiers, etc.; embedded information (such as meta information and/or hyperlinks); and/or embedded instructions (such as JavaScript scripts). The search engine 125 identifies content that matches the submitted query and responds by generating search results that are transmitted to one or more devices in a form that is useful for the devices. For example, in response to a query from the computing device 105, the search engine 125 may transmit a plurality of search results to be displayed in the web browser 110 that is executing on the computing device 105. The content database 130 may include one or more storage mediums. For example, in some implementations the content database 130 may include multiple computer servers each containing one or more storage mediums.

Applications executing on the computing device 105 may also provide partial queries being formulated by users, before the users have indicated completion of the queries. The applications may be, for example, a web browser 110, a toolbar running in the web browser 110, an e-mail application, a text-messaging application, a calendar application, a reminder application, a task application, and/or a search client running on the computing device 105. In some implementations, the applications provide each character of a query as it is typed or otherwise entered by the user. In some implementations, the applications provide multiple characters at a time, optionally following a pause by the user between character entries.

A partial query is a query formulated by a user prior to an indication by the user that the query is a completed query. In some implementations, a user may indicate a completed query by entering a carriage return and/or other character. In some implementations, a user may indicate a completed query by selecting a search button or other submission button in a user interface presented to the user. In some implementations, a user may indicate a completed query by speaking a command in a speech user interface. In some implementations, a user may indicate a completed query by pausing more than a predetermined amount of time during entry of the query. Other forms of providing a partial query and/or indicating a completed query may additionally and/or alternatively be utilized.

In response to a partial query entered by a user, the computing device 105 may facilitate entry of user input by providing suggested inputs to the user. For example, when the user enters one or more characters, the computing device 105 can provide query suggestions that are selected using the one or more characters. In some implementations, the query suggestions may be provided to the computing device 105 by query suggestion engine 120. The query suggestions that are provided may include words or phrases that include the one or more characters that were entered by the user. For example, complete words or extended phrases can be suggested for partial words or partial phrases that a user has entered (e.g., spoken, or typed using a physical or virtual keyboard). The query suggestions can also include words or phrases that are similar to (e.g., synonyms or spelling corrections of) the user input. The user can select one of the provided query suggestions to enter the text of the selected query suggestion. As referred to herein, a "selection" may include, for example a mouse-click, a click-through, a voice-based selection, a selection by a user's finger on a presence-sensitive input mechanism (e.g., a touch-screen device), and/or any other appropriate selection mechanism.

Figure 4A:
FIG. 4A illustrates a partial screenshot of an example graphical user interface that can be used to provide query suggestions to a user.
Figure 4B:
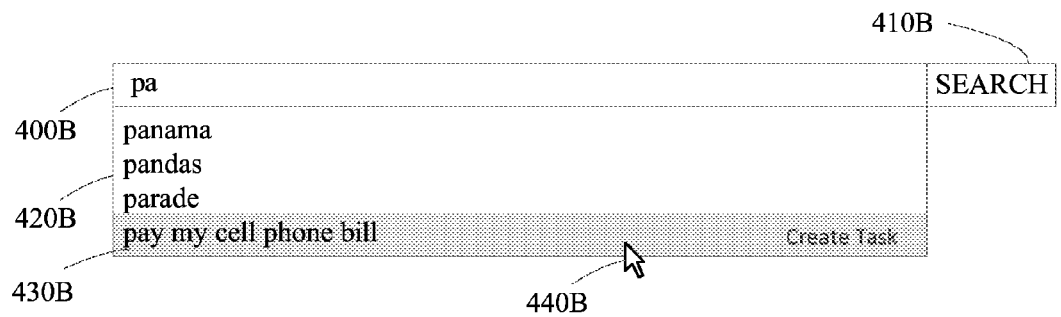
FIG. 4B illustrates another partial screenshot of an example graphical user interface that can be used to provide query suggestions to a user.

The query suggestions may be displayed to a user in a user interface of the computing device 105. For example, the query suggestions may be displayed within a cascaded drop down menu of the search field of an application, such as a web browser 110 executing on the computing device 105, as the user is typing the query, such as the partial user interfaces that are illustrated in FIGS. 4A through 4D and described herein. Also, for example, the query suggestions may be displayed in a plurality of separately selectable cells arranged in one or more rows or columns in a user interface. For example, query suggestions that are associated with a task may be displayed in a separate column from other query suggestions. In some implementations, one or more search results for a query suggestion may optionally be displayed as the user is typing the query. In some implementations, query suggestions that are related to a task may be displayed with an indication, such as an icon and/or words, to indicate to the user that the query suggestion is a task suggestion and may be utilized to associate a task with the user. For example, the suggestion "pay my cell phone bill" in the cascaded menu illustrated in FIG. 4B is annotated with "Create Task" to designate that the suggestion is a task suggestion.

In some implementations, in response to a partial query being entered at computing device 105, the search engine 125 may receive the partial query and forward the partial query to the query suggestion engine 120. In some implementations, in response to a partial query being entered at computing device 105, the one or more applications executing on the computing device 105 may optionally directly forward the partial query to the query suggestion engine 120. For example, in some implementations, the browser 110 may directly forward the partial query to the query suggestion engine 120. The query suggestion engine 120 may include memory for storage of data and software applications, a processor for accessing data and executing applications, and components that facilitate communication over the communication network 101. The query suggestion engine 120 may match a submitted partial query to one or more of a plurality of query suggestions that are an appropriate match to the query. In some implementations, the query suggestions may represent potential completed queries that may be provided to a user to enable the user to choose one of the query suggestions as a basis for utilization in a search application or other information retrieval or storage application. In some implementations, one or more of the query suggestions may be task suggestions and associated with a task that is related to the submitted query.

In some implementations, the query suggestions may include those determined based on a list of past user queries, a list of automatically generated queries, and/or real time automatically generated queries. In some implementations, the query suggestions may include those identified based on data retrieved from a database. For example, the query suggestion engine 120 may use prefix based matching to identify query suggestions from a list of past user queries and/or from matches to entries in the content database 130. Any listing of past user queries, past automatically generated queries, and/or queries that are related to one or more tasks, may optionally be stored in a query suggestion content database such as content database 130, for potential utilization as query suggestions and/or as a basis for query suggestions. The query suggestions provided by the query suggestion engine 120 may represent words or phrases that a user may want to include in addition to or instead of the query actually being typed. In some implementations, one or more of the provided query suggestions may be a task suggestion. For example, a query suggestion may be provided that shares one or more aspects with a task, such as the query suggestion "book a flight" and the task of booking a flight. A task may be associated with a query suggestion based on one or methods described herein.

In some implementations, the content database 130 may include one or more query suggestions that have been determined and/or scored, and/or otherwise ranked. In some implementations, the query suggestion engine 120 and/or task recognition engine 115 may provide the query suggestions to a user via the search engine 125, the query suggestion engine 120, and/or to the computing device 105 directly. In some implementations the query suggestion engine 120 may determine scores for one or more query suggestions; determine which query suggestions to provide to a user; and/or rank one or more query suggestions. For example, the query suggestion engine 120 may sort one or more query suggestions based at least in part on scores assigned to each of such query suggestions. The ranking may be based on one or more factors, such as the number of terms in the query suggestions, the length of term(s) in the query suggestions, and/or display parameters of the computing device 105. In some implementations, ranking of the query suggestions may be utilized to determine which query suggestions are provided to a user and/or in which order the query suggestions are displayed to the user.

In some implementations, the task recognition engine 115 may determine whether a task should be associated with a query suggestion based on one or more indications of the likelihood that the user has interest in being associated with the task. For example, in some implementations, the user may enter "pay c" without having interest in initiating a cell phone payment reminder task. In other instances, the user may enter "pay c" and have interest in a cell phone payment reminder task being initiated. In some implementations, the task recognition engine 115 may identify one or more additional documents that are related to a cellular phone of a user, such as an email that includes a cellular phone bill, and determine that the user has a cellular phone and that the user is likely to have interest in a reminder task based on the document. The task may be more likely to be associated with a query suggestion of "pay my cell phone" for the partial query "pay my c" than if the task recognition engine 115 had not identified further information indicating that the user has a cellular phone.

In some implementations, the task recognition engine 115 may determine whether to associate a task with a query suggestion based on the application that the user is utilizing to submit the query and one or more contextual terms in a query. For example, the user may submit the query "cell phone payment" to a search engine via web browser 110 and the task recognition engine 115 may determine that the user is more likely to be initiating a web search than the user has interest in task suggestions. Also, for example, the user may submit the query "make a cell phone payment" to a search engine of web browser 110 and the task recognition engine 115 may determine that the user is more likely to have interest in a task suggestion than the submission of the query "cell phone payment" based on the query including one or more terms, such as "make a" that indicate a likely task. Also, for example, one or more key words in a query may indicate that the query is being submitted to specifically return task suggestions, such as submitting "Task: cell phone payment" as a query in browser 110.

As another example, the user may be more likely to have interest in a reminder task when the user submits a query in a calendar application. The user may submit the same query "cell phone payment" in a calendar application and more likely be provided with a task suggestion of "reminder to pay cell phone" based on the greater likelihood that a user would have interest in a reminder task when user submits the query in the calendar application.

In some implementations, one or more task suggestions may be boosted in a ranked list of query suggestions to increase the likelihood that the user will be provided a given task suggestion. For example, a scoring associated with a task suggestion may be increased to a score that is higher than the score the query suggestion would otherwise have in a list of ranked query suggestions. Also, for example, a task suggestion may be boosted one or more places in a ranked list of query suggestions. In some implementations, a task suggestion may be included in a list of provided query suggestions that would otherwise have not been included in the list if a task was not associated with the query suggestion. For example, the task suggestion "pay my cell phone bill" may be included in a list of query suggestions for the query "cell phone," while the query suggestion "pay my cell phone bill" that is not associated with a task would not appear in the same list of provided query suggestions. In some implementations, a task suggestion may be associated with a task based on user data and/or information that is associated with the user; and/or entities in a content database that are related to one or more terms of a task. For example, a user may be provided directions to "Business1" as a task suggestion for the task "pay cell phone bill to Business1" based on the association of "Business1" with an address in a database and/or an address for "Business1" that is identified in an email of the user.

In some implementations, a query suggestion that has been identified by the query suggestion engine 120 may be associated with a task based on the presence of one or more terms in the query suggestion. The terms may include one or more phrases that are commonly associated with a task and that commonly appear in query suggestions that are related to a task. For example, the query suggestion "pay my cell phone bill" may be identified as a task suggestion based on a query that was entered by the user. Task recognition engine 115 may identify the phrase "pay my" in the query suggestion as potentially related to the user intending to pay a bill and associate the task of paying a bill with the task suggestion. If the user selects the task suggestion, task recognition engine 115 may optionally further prompt the user for additional information regarding the task, such as the recipient of the payment, the address to send payment, and/or the date when the bill is due.

In some implementations, the task recognition engine 115 may identify a task that shares an aspect with a query suggestion based on similarity between one or more terms of the query suggestion and a property of the task. The task recognition engine 115 may compare one or more terms of a query with a list of tasks and associated properties that are likely to be present in a query suggestion that is related to the corresponding task. For example, the query suggestion "cellular phone bill" may be identified as similar to a task of "Pay my cellular phone bill" and the user may be provided with the task suggestion based on the similarity between one or more key words that are associated with the task and the query suggestion (i.e., cellular, phone, and bill). In some implementations, task recognition engine 115 may use prefix based matching to identify query suggestions from a list of task suggestions (e.g., "pay cell phone bill" as similar to the query "pay cell") and/or the task recognition engine 115 may use term similarity to identify one or more terms in a query that are similar to one or more terms of a task suggestion (e.g., the task suggestion "cell phone payment by phone" as similar to the given query "pay my cellular phone bill").

In some implementations, task recognition engine 115 may identify one or more tasks that are specific to a user and provide a task suggestion based on similarity between user-specific information and the provided query. In some implementations, the task recognition engine 115 may identify tasks that are specific to the user based on one or more documents that are associated with the user, such as emails, recently displayed webpages, search history, calendar entries, social media notifications, text notifications, and/or contacts lists. In some implementations, task recognition engine 115 may identify and/or formulate a task suggestion based on one or more known latent attributes of the user. For example, the task recognition engine 115 may identify the geographic location of the user, the age of the user, and/or the occupation of the user from one or more sources, and the formulated task suggestion may be specific to the one or more latent attributes. In some implementations, task recognition engine 115 may identify and/or formulate a task suggestion that shares one or more aspects with a given identified task and provide the task suggestion in response to a query that shares similarities with the task suggestion. For example, the task recognition engine 115 may identify a potential task for a user from a user's calendar entry of "Bob's Birthday party" on April 4. The user may enter the query "Buy present" and the task recognition engine 115 may provide the task suggestion "Buy Bob a birthday present" based on the identification of the calendar entry and the similarity of the text of the calendar entry and the query. A task may be associated with the user and/or suggested to the user based on the user selecting the task suggestion "Buy Bob a birthday present," and the user may be associated with the reminder task of "Buy Bob a birthday present by April 4" if the user selects the provided task suggestion.

In some implementations, task recognition engine 115 may additionally or alternatively associate a task with the user when the user selects a task suggestion from the query suggestions that the query suggestion engine 120 provides to the user in response to a query. In some implementations, the user may identify a task suggestion by selecting the suggestion from a drop down list of query suggestions, such as the partial graphical user interfaces in FIGS. 4A through 4D. For example, with reference to FIG. 4B, the user may select the task suggestion "pay my cell phone bill" by moving the cursor 440B over the task suggestion 430B and left clicking on a mouse. In some implementations, task suggestions may be distinguished from query suggestions, such as the task suggestion "pay my cell phone bill" in FIG. 4B, which is displayed with the additional words, "Create Task." In some implementations, a task may be associated with a user based on the user selecting a provided task suggestion. In some implementations, the user may have the option of utilizing a provided task suggestion as a search query without associating a task with the user in addition to utilizing the query suggestion as a task suggestion. For example, "Create Task" may be selectable and associate the task that is associated with the corresponding task suggestion with the user. Alternatively, selecting the query suggestion (e.g., selecting the text of the task suggestion without selecting "Create Task") may utilize the task suggestion as an autocomplete suggestion and result in search results based on the query suggestion without associating a task with the user.

In some implementations, the task recognition engine 115 may associate additional information with a task based on additional information that is provided to the task recognition engine 115 by the user and/or that is available about the task. For example, the user may be prompted at the time that the user selects the task suggestion to provide additional information about the task utilizing a task information prompt that may share one or more characteristics with the task information prompt illustrated in FIG. 4E and described herein. In some implementations, the task recognition engine 115 may identify additional information about a task based on one or more terms that are present in the query that was provided by the user and/or present in an identified task suggestion. For example, the query suggestion "flights LAX" may be selected by the user and the airport designation "LAX" may be associated with the created task as additional information based on its presence in the provided query suggestion. In some implementations, additional information about a task may be available from one or more databases, such as an entity database. For example, for a task suggestion of "flights LAX," a database may be utilized to identify mappings between "LAX" and a phone number and/or address of the LAX airport, which may further be associated as additional information of a task of "Book a flight."

In some implementations, task recognition engine 115 may identify a task and/or additional information related to the completion of a task based on mappings between multiple entities and/or mappings between entities and one or more entity properties. The task recognition engine 115 may identify the entities and/or entity properties by accessing one or more databases such as an entity database. For example, an entity database may include one or more knowledge graphs mapping entities and entity properties and/or entities and other entities. In some implementations, task recognition engine 115 may determine a likely task and/or property of a task based on mappings between multiple entities and/or entities and entity properties, in combination with artificial intelligence having predictive capabilities. For example, in some implementations one or more mappings between two or more entities may define relationships between the entities that may be utilized to determine task suggestions. For example, a calendar entry may include the terms "Buy present for Bob's birthday." Based on the terms, an entity associated with "birthday party" and an entity associated with the action of "buying a present" may be identified. Based on mapping in the entity database between the entities (e.g., the action of "buying a birthday present" as being a task that may be performed for a "birthday party"), a task suggestion may be provided for the query that is associated with the task of "buying a birthday present." Further information may be associated with the task based on additional entities and/or actions mapped to "birthday party," such as "directions to party" and/or "phone number for contact," and additional information associated with the entities may be identified from documents and/or other data of the user. For example, an entity associated with "birthday party" may be associated with an entity associated with the action of "getting directions," which may further be associated with an entity associated with "address." Contact information for "Bob" may be identified in a contacts application for a contact of "Bob," which may include an address that may be potentially associated with the task. For example, the task of "go to Bob's party" may be associated with address that was identified from the contact "Bob" in the contacts application of the user. In some implementations, the likelihood that the identified task suggestion is the correct task suggestion may be determined and optionally utilized in determining a confidence level associated with the task suggestion and/or the confidence level that additional information should be associated with a task.

Also, for example, a query may include the text "pay my cell phone bill" and/or a spoken query by a user may be identified as "pay my cell phone bill at Business 1." The terms "pay cell" may indicate a predicted service action and the text "Business 1" may indicate the service action is related to an entity associated with "Business 1." A service action may be associated with certain properties associated with an entity such as, for example, one or more phone numbers that may be called to pay a cellular phone bill, one or more e-mail addresses that enable payment, and/or one or more webpages that enable payment. A mapping between an entity associated with "Business 1" and properties of that entity that may indicate one or more phone numbers related to that entity that may be contacted to submit payment, one or more e-mail addresses related to that entity that enable payment, and/or one or more webpages related to that entity that enable payment may be identified. One or more of the mapped properties may be identified as additional information about a task. For example, a webpage that enables payment of a cellular phone bill and is mapped to the entity associated with "Business 1" may be identified as additional task completion information. In some implementations, a likelihood that identified additional information is correct additional information may be determined and optionally utilized in determining a confidence level associated with the task. Additional and/or alternative methods of identifying additional information related to the completion of a task in combination with artificial intelligence having predictive capabilities may be utilized.

In some implementations, task recognition engine 115 may identify tasks and/or additional information about tasks based on identification of one or more properties of an entity and one or more terms and/or phrases that are present in a provided query and/or document. Associations of tasks and additional information may be identified from an entity database that may share one or more aspects with content database 130. For example, task recognition engine 115 may identify an alias and/or additional information associated with an entity from a provided query, a user calendar entry, or a user-created and/or user-edited document. The task recognition engine 115 may identify the entity that is associated with the alias and/or additional information by accessing one or more database such as an entity database. One or more additional properties associated with the entity, additional entities associated with the entity, and/or one or more additional properties associated with associated entities may be utilized as a task and/or as additional task information. For example, selected task suggestion of a user may include the phrase "Fly to Los Angeles." Task recognition engine 115 may identify the task suggestion as related to a task that is associated with the user and identify an "airport" entity that is associated with "fly" and "Los Angeles" in an entity database. The task recognition engine 115 may identify an alias of the entity associated with "fly" and "Los Angeles" as "LAX" and associate the alias of the airport, LAX, with the task that is related to the calendar entry. Additional information about flights and/or airport information may be associated with the task based on associated information in an entity database and/or other database. In some implementations, additional information may be identified based on latent attributes of a user. For example, the origination airport to associate with the task of "fly to Los Angeles" may be identified based on identifying the current location of the user (e.g., associating the origination location as "O'Hare" based on identifying that the user is located in Chicago utilizing GPS data).

The communication network 101 facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Many other configurations are possible having more or fewer components than the environment shown in FIG. 1. For example, although the query suggestion engine 120 and the task recognition engine 115 are each illustrated alone in FIG. 1, it is understood that the query suggestion engine 120 and/or the task recognition engine 115 may optionally be combined with one another and/or with one or more of the search engine 125 and/or the computing device 105 in some implementations.

Figure 2:
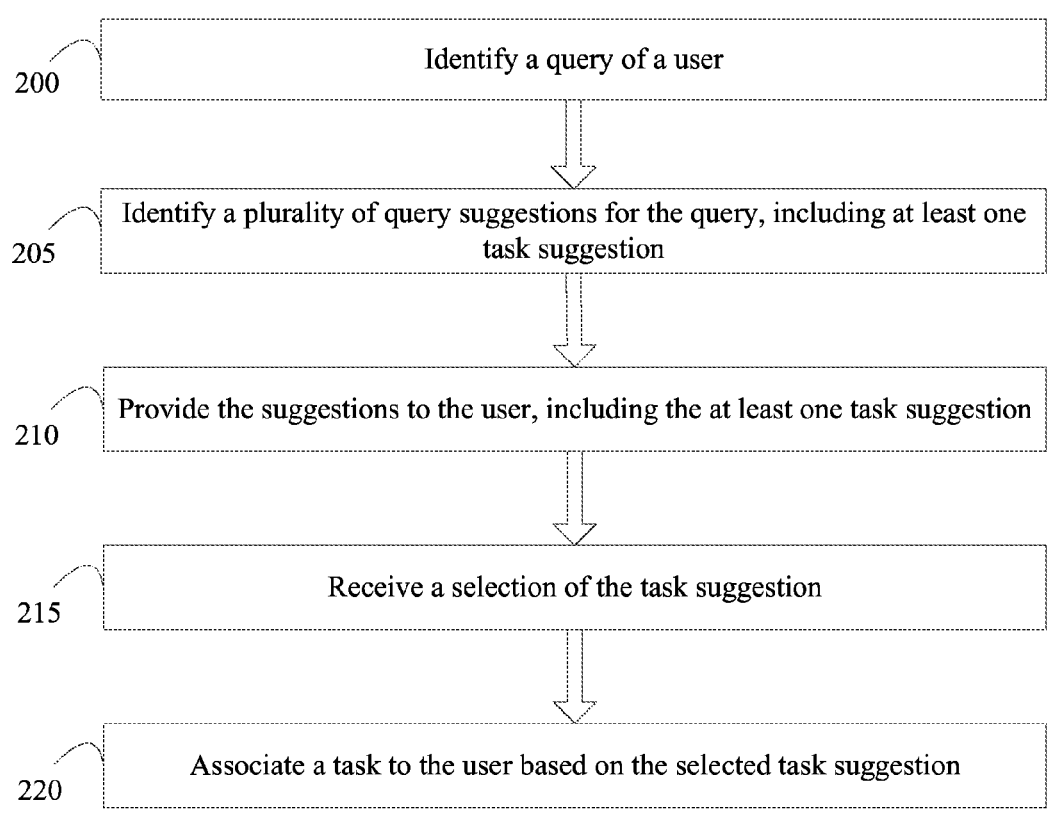
FIG. 2 is a flow chart illustrating an example method of associating a task with a user based on the user selecting a task suggestion from a plurality of query suggestions.

Referring to FIG. 2, a flow chart illustrating an example method of associating a task with a user based on the user selecting a task suggestion from a plurality of query suggestions is provided. Other implementations may perform the steps in a different order, omit certain steps, and/or perform different and/or additional steps than those illustrated in FIG. 2. The steps of the method illustrated in FIG. 2 may be performed by one or more components illustrated in FIG. 1.

At step 200, a query from a user is identified. In some implementations the query may be entered by a user via a computing device executing a web browser, such as computing device 105 and web browser 110. In some implementations, the user may enter a complete query into the web browser 110 and indicate that the query is complete, such as by selecting a search button, stopping typing for a predetermined period of time, speaking a voice command, and/or pausing while speaking. In some implementations, the user may enter a partial query in anticipation of receiving suggested queries.

At step 205, one or more query suggestions are identified based on the query that was identified in step 200. In some implementations, query suggestion engine 120 may identify query suggestions for the provided query as described herein. For example, for a partial query of "pa," the query suggestions illustrated in FIG. 4A may be obtained. The query suggestions of FIG. 4A are illustrated in the drop-down box 420A. For the query "pa," the query suggestions all contain "pa" as the prefix and contain additional text to form a complete word or phrase starting with "pa."

In some implementations, one or more of the identified query suggestions may be task suggestions. The task suggestions may share one or more aspects with a task that may be performed by the user. For example, query suggestion engine 120 may identify the query suggestion "pay my cell phone bill" and task recognition engine 115 may associate the task of paying a cellular phone bill with the query suggestion based on the likelihood that the user has interest in paying a cellular phone bill. In some implementations, the task may be associated with the query suggestion based on similarity between the query suggestion and the task. In some implementations, the task recognition engine 115 may associate a task with the query suggestion based on user attributes and/or information from one or more user-created and/or user-edited documents. For example, task recognition engine 115 may identify an email from a cellular phone company that was sent to the user as a reminder to pay a bill and the task recognition engine 115 may determine that the user has a bill to pay in the future based on the email. Also, for example, the task recognition engine 115 may recognize an appointment from a calendar application and associate the appointment with a likely task, and then associate the task with a given task suggestion to provide to the user. In some implementations, the query suggestion engine 120 may identify one or more query suggestions based on information that is provided by the task recognition engine 115. For example, query suggestion engine 120 may not initially identify "pay my cell phone" as a query suggestion for the query "cell phone payment methods," and task recognition 115 may provide information to query suggestion engine 120 to identify "pay my cell phone" as a query suggestion based on additional and/or alternate similarity methods (e.g., word and/or term matching, entity mapping, pre-defined list of common task suggestions).

At step 210, the query suggestions are provided to the user, including at least one task suggestion identified at step 205. The suggestions may be provided to the user via the computing device 105. In some implementations, the task suggestions and/or query suggestions may be provided to the user through a graphical user interface that shares one or more aspects with the graphical user interfaces illustrated in FIGS. 4A through 4D. In some implementations where both task suggestions and non-task suggestions are provided to the user, the task suggestions may be provided in a different form and/or annotated in a different manner than non-task suggestions to alert the user to the nature of one or more suggestions. For example, task suggestions may be annotated with "Create Task," such as the task suggestion "pay my cell phone bill" in FIG. 4B.

In some implementations, a task is associated with a query suggestion only when the confidence level that the task is related to the query suggestion exceeds a threshold confidence level. The task recognition engine may utilize terms in the query suggestion, attributes that are associated with the user, and/or documents that are associated with the user to determine the likelihood that the user has interest in being associated with the task. For example, query suggestion engine 120 may identify a query suggestion of "cell phone payment Business1" and task recognition engine 115 may identify a task of "pay my cell phone bill to Business1" as related to the query suggestion. Task recognition engine 115 may further identify that the user has a cellular phone contract with "Business2" based on information identified in an email of the user, and determine that the user is less likely to have interest in paying a cellular phone bill to "Business1." Additionally, task recognition engine 115 may lower the ranking of the query suggestion "pay my cell phone bill to Business1" in the provided query suggestions.

At step 215, a selection of a task suggestion from the query suggestions that were provided to the user at step 210 is received. In some implementations, the user may select a task suggestion utilizing a computing device that shares one or more aspects with the computing device 105. In some implementations, the user may select a task suggestion by indicating the selection from a graphical list of suggestions that may share one or more aspects with the graphical user interfaces of FIGS. 4A and 4B. In some implementations, the user may additionally provide information associated with a task when submitting a selected task suggestion to the system. For example, the user may additionally provide a web address for an online bill pay system along with a selection of a task suggestion that is related to paying a cellular phone bill. In some implementations, one or more selected task suggestions may additionally trigger one or more additional actions when the query suggestion is selected by the user, such as adding an appointment to a calendar, sending an email, directing the user to a website, and/or prompting the user to enter additional information utilizing a prompt screen that may share one or more characteristics with the graphical user interface in FIG. 4E. In some implementations, the selected task suggestion may be associated with the task of utilizing the task suggestion as a search query suggestion to submit to a search engine that may share one or more aspects with search engine 125. In some implementations, the selected task may additionally or alternatively be submitted by the user with a selected task type to differentiate between multiple tasks that may be associated with a task suggestion. For example, the task suggestion "go to cellular phone store" may be associated with a task of purchasing a new cellular phone and may additionally be associated with a task of paying a cellular phone bill. "Go to cellular phone store" may be provided to the user twice and annotated differently to inform the user of the task that is associated with each task suggestion that would otherwise appear to the user to be identical (e.g., "Go to cellular phone store to purchase new phone" and "Go to cellular phone store to pay cellular phone bill"). Also, for example, one task suggestion may be provided to the user and the user may be prompted to further provide a task type with the task suggestion, such as utilizing a graphical user interface that that shares one or more aspects with the interface illustrated in FIG. 4E and described herein. In some implementations, multiple tasks may be associated with the user when the user selects a task suggestion that is associated with multiple tasks of different task types. For example, both a reminder task and an event task may be associated with the user when the user selects the task suggestion "birthday of Bob."

In some implementations, the received query suggestion may be utilized both as a search query and to associate a task with a user. For example, the query suggestion "pay my cell phone" may be submitted to the search engine 125 in addition to the query suggestion being utilized to associate a task with a user as described in step 220. The user may be provided with search results based on the selected query suggestion in addition to a task being associated with the user. In some implementations, query suggestions may be utilized only to associate tasks with a user and no search results may be provided to the user.

At step 220, a task is associated with the user based on the task suggestion that was received at step 215. In some implementations, the task associated with the user may include a task type and/or additional information that has been provided by the user when the user selects a task suggestion. In some implementations, additional information may be associated with a task with a method that shares one or more steps with the method illustrated in FIG. 3 and described herein. In some implementations, the task association, task type, and/or additional information are stored in one or more databases that may share one or more aspects with content database 130.

Figure 3:
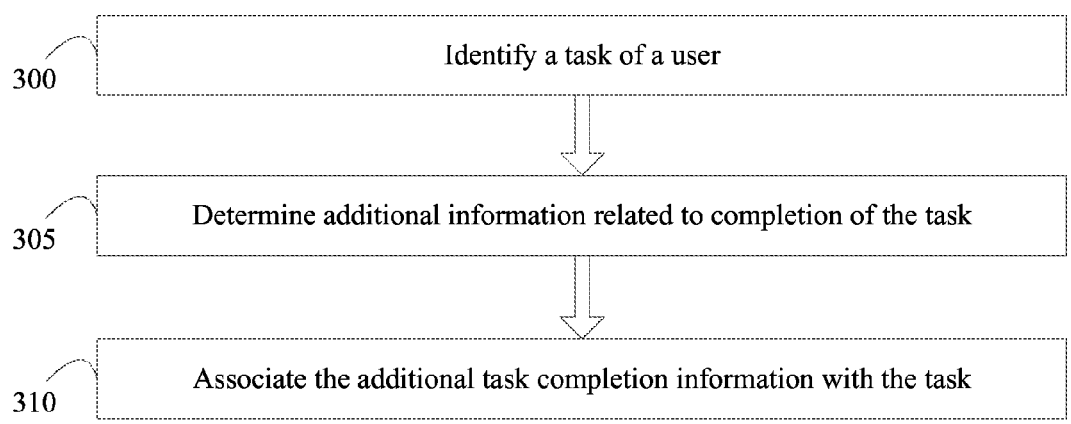
FIG. 3 is a flow chart illustrating an example method of determining additional information related to completing a task associated with a user.

Referring to FIG. 3, a flow chart illustrating an example method of determining additional information related to completing a task associated with a user is provided. Other implementations may perform the steps in a different order, omit certain steps, and/or perform different and/or additional steps than those illustrated in FIG. 3. The steps of the method illustrated in FIG. 3 may be performed by one or more components illustrated in FIG. 1.

At step 300, a task that is associated with a user is identified. The task may be associated with the user via the method that is illustrated in FIG. 2 and described herein. For example, a task may be associated with the user based on the user selecting a task suggestion from a plurality of suggestions that were provided to the user based on a partial query or completed query that was provided by the user. In some implementations, the task may be associated with the user based on other actions of the user. For example, the task may be associated with the user based on the user adding an appointment to a calendar application executing on computing device 105. Also, for example, a task may be associated with a user based on the content of one or more user-edited documents.

At step 305, additional information regarding completing the task is determined. Additional information may include information that facilitates the completion of the task. For example, a task to pay a cellular phone bill may additionally be associated with a webpage and/or a telephone number to facilitate the user in paying a cellular phone bill. In some implementations, the additional information may be provided by the user. For example, the task recognition engine 115 may identify the task of "pay my cell phone" and prompt the user to enter additional information related to completing the task, such as the due date, a website for submitting payment, and/or an amount that is to be paid. The prompt to the user may share one or more aspects with the graphical user interface that is illustrated in FIG. 4E and described herein.

In some implementations, task recognition engine 115 may determine additional information about a task utilizing an entity database that may share one or more aspects with content database 130. For example, the entity associated with "Business1" may be determined to be additional information that is associated with a task based on user input from a prompt and/or from one or more documents associated with the user, such as emails, calendars, contacts, and/or recently visited websites. Task recognition engine 115 may determine additional information about "Business1," such as the address, telephone number, and/or website of "Business 1" based on associations between the entity associated with "Business1" and one or more additional entities in an entity database. Such additional information may be further associated with the task and may be utilized to provide the user with information that is pertinent to completing the task.

In some implementations, task recognition engine 115 may associate additional information with a task based on one or more words and/or phrases in the provided query. For example, the user may provide a query "pay cell phone bill Business 1" and the task recognition engine 115 may determine that the task of paying a cellular phone bill is related to the query. The task recognition engine 115 may further associate "Business 1" with the task as additional information that is related to completion of the task. In some implementations, information in the provided query may be utilized to locate additional information in an entity database. For example, the task recognition engine 115 may identify the entity associated with "Business 1" from the query "pay my cell phone bill Business1" and identify additional information related to the entity based on the presence of "Business 1" in the query.

At step 310, the additional information regarding the completion of the task is associated with the task. The association of the additional information and the task may be stored in a database that may share one or more aspects with content database 130. In some implementations, the additional information associated with a task may be utilized by search engine 125 for future queries and/or may be utilized by task recognition engine 115 to identify additional task suggestions, tasks, and/or additional information about additional tasks. For example, a task may be associated with a user for paying a cellular phone bill that is associated with "Business 1" as the name of the cellular phone provider. In response to selection of a future query of "cancel my cell phone," it may be determined that the user is likely to have "Business 1" as a cellular phone provider based on the additional information associated with the task in the content database 130 and "Business 1" may be associated with the new task of cancelling cellular service.

Although methods of providing task suggestions and associating tasks with users are illustrated in the Figures, other methods may additionally and/or alternatively be utilized to identify task suggestions and associate tasks with a user based on a query. Certain implementations of the methods of providing task suggestions have been described as taking place in a substantially real time environment. However, one or more aspects of methods described herein may be implemented in an offline mode. For example, implementations of methods described herein may be utilized to identify a task suggestion and/or associate a task suggestion with a user in response to a query that may be made available for utilization in a real time environment in processing query suggestions.

FIGS. 4A through 4G illustrate graphical user interfaces that can be used to allow a user to enter a query, provide query suggestions to the user, and to allow the user to select a query suggestion based on the query. In some implementations, selecting one or more query suggestions from the provided query suggestions may result in a web search based on the terms of the query suggestion. In some implementations, the graphical user interface may be part of an application, such as a calendar application and/or an email application. In some implementations, one or more of the provided query suggestions may be a task suggestion and a task may be associated with a user based on the task suggestion that is selected by the user. In some implementations, selecting a task suggestion from a provided list of query suggestions may additionally initiate a web search in addition to associating a task with a user. In some implementations, selecting a task suggestion will result in a task suggestion being associated with the user without a search being conducted.

Referring to FIG. 4A, a partial screenshot of an example environment that can be used to provide query suggestion results to a user is illustrated. In FIG. 4A, the partial screenshot includes a search field representation 400A and a search button representation 410A. In this example, the user has entered the partial search query "pa" into the search field representation 400A and a drop down menu 420A of the search field is displayed. A module that may share one or more characteristics with query suggestion engine 120 may identify one or more candidate query suggestions that may be associated with the prefix "pa." A module that may share one or more characteristics with task recognition engine 115 may identify one or more candidate task suggestions that may be associated with the prefix "pa" in addition to the query suggestions provided by query suggestion engine 120. The query suggestion engine 120 may identify query suggestions based on, for example, a list of past user queries, a list of automatically generated queries, and/or real time automatically generated queries. The task recognition engine 115 may identify task suggestions based on, for example, similarities between a query suggestion and an aspect of a task, and/or similarity between a potential task suggestion and one or more likely tasks of the user based on additional information that is known about a user and/or that is provided by a user. Query suggestion engine 120 may associate a score with each identified query suggestion and/or task suggestion, and rank the suggestions based on the associated scores. The drop down menu 420A includes four query suggestions that are based on the partial search query "pa," including the task suggestion "pay my cell phone bill."

The user may optionally choose any of the suggestions and utilize the suggestion as a completed query or the basis for a completed query to retrieve information based on the identified query suggestion. In some implementations, the user may select a query suggestion that is additionally associated with a task (i.e., a task suggestion), and the associated task may be associated with the user. In some implementations, the user may request additional display sets of query suggestions to be displayed. For example, in some implementations a user may scroll within the drop down menu 420A to display one or more additional query suggestions from further display sets. In some implementations, the user may indicate that the search query that is entered into search field 400A is complete by selecting search button 410A. In some implementations, one or more of the query suggestions in drop down menu 420A may be selectable and the user may choose a query suggestion by selecting a suggestion in drop down menu 420A. In some implementations, query suggestions that are task suggestions may be displayed differently than other query suggestions and a task may be associated with the user when the user selects a task suggestion. For example, task suggestions may be displayed in an alternate color, and a separate column, and/or marked with an indication to distinguish query suggestions from task suggestions as illustrated in FIG. 4B and described herein.

Referring to FIG. 4B, another partial screenshot of an example environment that can be used to provide query suggestion results to a user including a task suggestion is illustrated. In FIG. 4B, the partial screen shot includes a search field representation 400B and a search button representation 410B. The query suggestions in drop down menu 420B are the same query suggestions as the query suggestions in FIG. 4A with an entry in the list highlighted by the hovering over of a cursor 440B. The "pay my cell phone bill" suggestion is illustrated as a task suggestion and includes the words "Create Task" to notify the user that the entry is associated with a task in addition to or instead of a query suggestion. In some implementations, task suggestions may additionally be marked with, for example, a different color, a graphical icon, or in a different column to differentiate task suggestions from query suggestions. In some implementations, "Create Task" may be selectable, and selecting "Create Task" may indicate that the user would like to associate the task associated with "pay my cell phone bill" with the user. In some implementations, the user may be prompted for additional information about the task if the user selects the "Create Task" link.

Figure 4C:
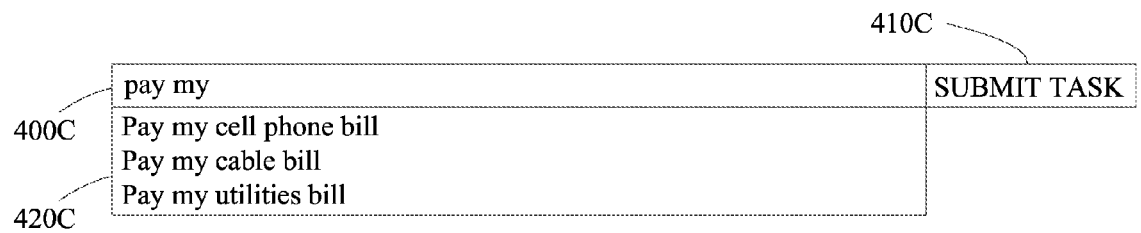
FIG. 4C illustrates another partial screenshot of an example graphical user interface that can be used to provide query suggestions to a user.
Figures 4D, 4E:
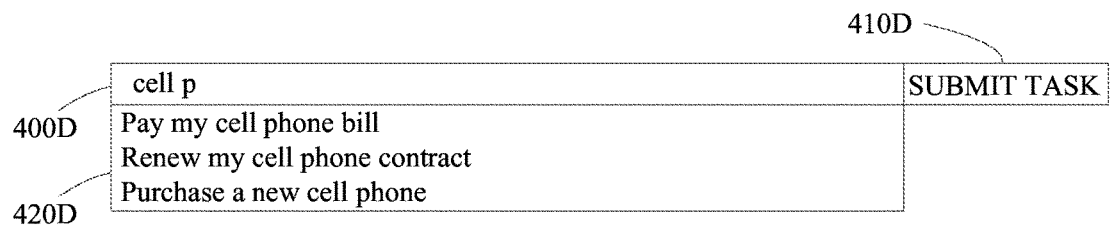
FIG. 4D illustrates another partial screenshot of an example graphical user interface that can be used to provide query suggestions to a user.
FIG. 4E illustrates a partial screenshot of an example graphical user interface that can be used to prompt a user to provide additional information about a task.

Referring to FIG. 4C, another partial screenshot of an example graphical user interface that can be used to provide task suggestions to a user is illustrated. The graphical user interface includes a task field representation 400C and submit task button 410C to allow the user to select a task suggestion that is associated with a selected task and/or to submit one or more entries to a search engine as a search query. In some implementations, the example graphical user interface of FIG. 4C may be part of a task entry interface of one or more applications and the selected entry in task field representation 400C may not be submitted to a search engine (i.e., all selected entries may associate tasks with the user and no selected tasks produce search results). The task field representation 400C includes the partial query "pay my" that has been entered by the user. The task suggestions in drop down menu 420C are task suggestions that are based on information that has been identified based on user attributes and/or one or more user documents and that share similarities with the query in task field 400C. The provided task suggestions are associated with tasks that are potentially of interest to the user based on, for example, information that was identified from calendar entries of the user, emails of the user, previously visited webpages of the user, and/or contacts from an electronic address book of the user. For example, the task recognition engine 115 may identify the phrase "pay my" to be potentially related to a task that is related to the user paying a bill. Task recognition engine 115 may identify one or more entries in a calendar application that are related to bills and provide the user with the task suggestions in drop down menu 420C that are associated with tasks of paying bills. The user may select a task suggestion from the drop down menu 420C and select the submit task button 410C and the task corresponding to the selected task suggestion may be associated with the user. In some implementations, query suggestions that are not associated with a task may be provided in drop down menu 420C in addition to task suggestions. In some implementations, task suggestions may be annotated with the task type of the user and/or task suggestions may be otherwise displayed differently than non-task query suggestions as illustrated in FIG. 4B and described herein.

Referring to FIG. 4D, another partial screenshot of an example graphical user interface that can be used to provide query suggestions to a user based on entity relationships is illustrated. The graphical user interface includes a task field representation 400D and submit task button 410D to allow the user to select a task suggestion that is associated with a selected task. The task suggestions in drop down menu 420D are query suggestions that are based on similarities between a partial query suggestion that has been provided by the user in task field 400D and one or more entities from an entity database. The partial query "cell p" has been utilized to identify the entity associated with "cell phone" based on similarities between the partial query and the text "cell phone" (e.g., prefix-based matching).

In some implementations, one or more of the identified query suggestions may be boosted or lowered in ranking of importance based information, attributes, and/or documents that are associated with the user. In some implementations, the task recognition engine 115 may provide query suggestion engine 120 with additional information about one or more query suggestions to affect the ranking of a query suggestion, such as user attributes and/or documents associated with the user. For example, the query suggestion engine 120 may identify an entity associated with "cell phone," which may be mapped with entities associated with the concepts of "paying," "renewing," and "purchasing" based on those actions being possible actions that may be associated with a cell phone. Query suggestion engine 120 may identify query suggestions of "Pay a cell phone bill," "Renew a cellular phone contract," and "Make a phone call" based on the related entities in the database, and the task suggestions may be filtered, ranked, and/or otherwise provided to the user based on user attributes and/or information identified from one or more user documents. For example, the task suggestion "pay a cell phone bill" may be boosted in ranking based on, for example, information identified in emails about a cellular phone bill, calendars entries, and/or webpage navigation history of the user that indicates that the user is more likely to have interest in a task to pay a cellular phone bill than the user has interest in the task of "calling on a cell phone." Also, for example, task suggestion "Call on a cell phone" may related to the entity "cell phone," and query suggestion engine 120 may lower the rank of the task suggestion related to calling on a cellular phone based on information that the user does not own a cellular phone.

Referring to FIG. 4E, another partial screenshot of an example graphical user interface that can be used to prompt a user to provide additional information about a task is illustrated. The illustrated graphical interface may be provided to the user at step 305 of the method in FIG. 3 to determine additional information about a task that has been associated with a user. Data entered into the fields of the graphical user interface may be utilized in step 310 to associate the additional information with the task. In some implementations, the user may be prompted to enter the information when the user performs an additional step, such as selecting a task from a graphical user interface that shares one or more characteristics with the interfaces illustrated in FIGS. 4A through 4D, when the user opens a particular application (e.g., a calendar application, a contacts application, etc.), and/or when the user unlocks or activates a mobile electronic device. In some implementations, the graphical user interface may display additional and/or alternative fields based on the type of the task, the device that is utilized to display the interface to the user, and/or the application that is utilized to display the interface to the user. In some implementations, the graphical user interface may include buttons or other interface elements to permit the user to associate the provided information with multiple and/or alternative tasks. For example, the graphical user interface may include a button to associate additional provided information with an event task and/or with a reminder task.

In some implementations, a task may be further associated with a task type as described herein. The indication for a task suggestion in the partial graphical interface of FIG. 4B may include an indication of the task type that is associated with a task suggestion. For example, the task suggestion "pay my cell phone bill" may be associated with a reminder task type. The indication that is displayed with the task suggestion may be representative of the task type, such as "Create Reminder." Also, for example, a task suggestion that is associated with a purchase task type may be displayed with the indication "Create Purchase Task." In some implementations, one task suggestion may be associated with multiple tasks with different task types. In some of those implementations, one task suggestion may be displayed with multiple task type indications. In some implementations, the same task suggestion may appear in the graphical interface multiple times with different task type indications. For example, "pay my cell phone bill" may be associated with a purchase task (e.g., to enable auto payment, to locate a retail store) and a reminder task (e.g., to remind the user to pay the bill). In some implementations, "pay my cell phone bill" may be annotated in the list with both "Create Reminder" and "Create Purchase Task." Also, for example, "pay my cell phone bill" may be displayed in the list annotated with "Create Reminder" and displayed a second time with the annotation "Create Purchase Task."

Figure 4F:
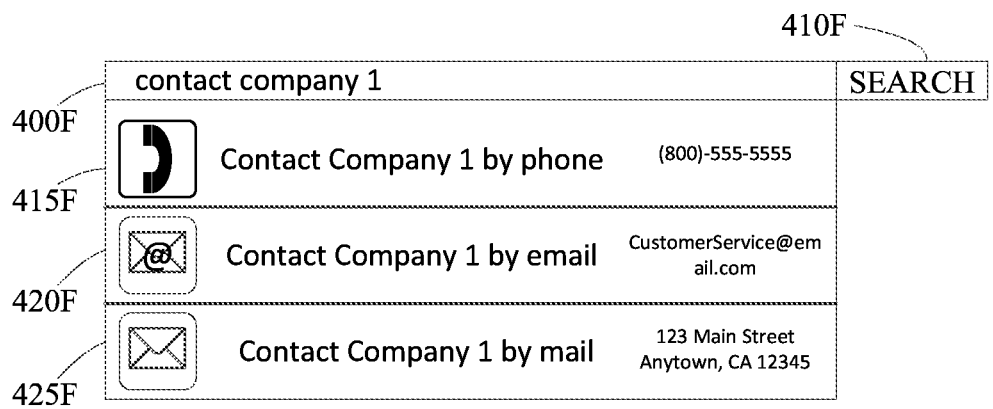
FIG. 4F illustrates a partial screenshot of an example graphical user interface that can be used to provide query suggestions and additional task completion information to a user.

Referring to FIG. 4F, a partial screenshot of an example graphical user interface that can be used to provide query suggestions and additional task completion information to a user is provided. The graphical user interface includes a task field representation 400F and search button 410F. In this example, the user has entered the partial search query "Contact Company 1" into the task field representation and task suggestions 415F, 420F, and 425F are displayed. A module that shares one or more characteristics with query suggestion engine 120 and/or task recognition engine 115 may identify one or more query suggestions and/or candidate task suggestions based on the query that was entered by the user and provide the suggestions to the user. In some implementations, selecting a suggestion may submit the selection to a search engine. Additionally or alternatively, selecting a candidate task suggestion may associate a task with the user. For example, selecting call task suggestion 415F may associate a task to call Company 1 with the user. Also, for example, selecting call task suggestion 415F may populate a dialing application of the user with the phone number of Company and/or set a calendar reminder to call Company 1 in a calendar application of the user. In some implementations, the partial query that was entered by the user in search field representations 400F may be submitted to a search engine as a partial search query when the user selects search button 410F. The task field representation 400F includes partial query "Contact Company 1" that has been entered by the user. The task suggestions 415F, 420F, and 425F are task suggestions that may be based on information that has been identified from user attributes, user documents, and/or one or more databases as described herein. For example, task recognition engine 115 may identify one or more entries in a contacts application of the user that are related to Company 1 and provide the user with the task suggestions that are associated with tasks of contacting Company 1 based on an identified phone number, email address, and/or mailing address. Also, for example, task recognition engine 115 may identify one or more entities in an entity database that are associated with Company 1 and identify, for example, a phone number for Company 1 from information that is associated with the identified entity. Additional information that is identified for a suggested task may be provided with the task suggestion. For example, for the call task suggestion 415F, the user is provided with a phone number in addition to a description of the task which may be identified from, for example, a contacts application of the user. Also, for example, email task suggestion 420F includes an email address for the entity "Company 1" which may be identified from, for example, browser history of the user that includes viewing a contact webpage for "Company 1." Also, for example, mail task suggestion 425F is provided with a street address for the entity "Company 1," which may be identified from, for example, an electronic bill from Company 1 that was received by the user.

The task suggestions 415F, 420F, and 425F are annotated with icons that identify the task type for each of the provided task suggestions. For example, the call task suggestion 415F includes a telephone icon to provide the user with a graphical indication of the type of the task. In some implementations, the icon may be selectable and the user may select the icon to indicate that the task that is associated with the icon should be associated with the user; and the user may select the query suggestion (e.g., selecting the text of the task suggestion without selecting the icon) to utilize the entry as search query suggestion without associating a task with the user. In some implementations, selecting any portion of a provided task suggestion may associate the task of the selected task suggestion with the user.

Figure 4G:
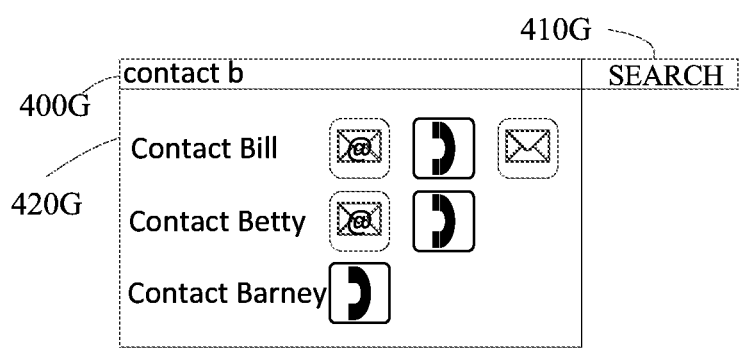
FIG. 4G illustrates a partial screenshot of an example graphical user interface that can be used to provide query suggestions with task type indications to a user.

Referring to FIG. 4G, a partial screenshot of an example graphical user interface that can be used to provide query suggestions with task type indications to a user is provided. The graphical user interface includes a task field representation 400G and search button 410G. In some implementations, selecting the search button 410G may submit the partial query that is entered in task field representation 400G as a search query. The task field representation 400G includes partial query "contact b" that has been entered by the user. The dropdown menu 420G includes task suggestions that are based on information that has been identified from user attributes, one or more user documents, and/or one or more databases as described herein. The provided task suggestions are associated with tasks that are potentially of interest to the user based on, for example, information that is identified from calendar entries of the user, emails of the user, previously visited webpages of the user, and/or contacts from an electronic address book of the user. Icons next to each task suggestion indicate different types of tasks that may be associated with the user based on identified potential task completion steps. For example, "Contact Bill" is followed by icons for emailing, phoning, and mailing tasks. Task recognition engine 115 may identify one or more entries in a contacts application, email, and/or document in the browsing history of the user, and identify an email address, a phone number, and a mailing address associated with "Bill." Also, for example, the entry for "Betty" includes an email task icon and a phone task icon, but not a mailing icon. This may indicate to the user that email and phone contact information has been identified for "Betty," and tasks relating to emailing and/or phoning "Betty" may be associated with the user. In some implementations, the icons may be selectable, and selecting an icon will associate the task with the task type that is represented by the icon that was selected. For example, clicking on the phone icon next to "Contact Bill" may associate a task of "Call Bill" with the user. Also, for example, selecting the email icon next to "Contact Bill" may associate an "Email Bill" task with the user.

Figure 5:
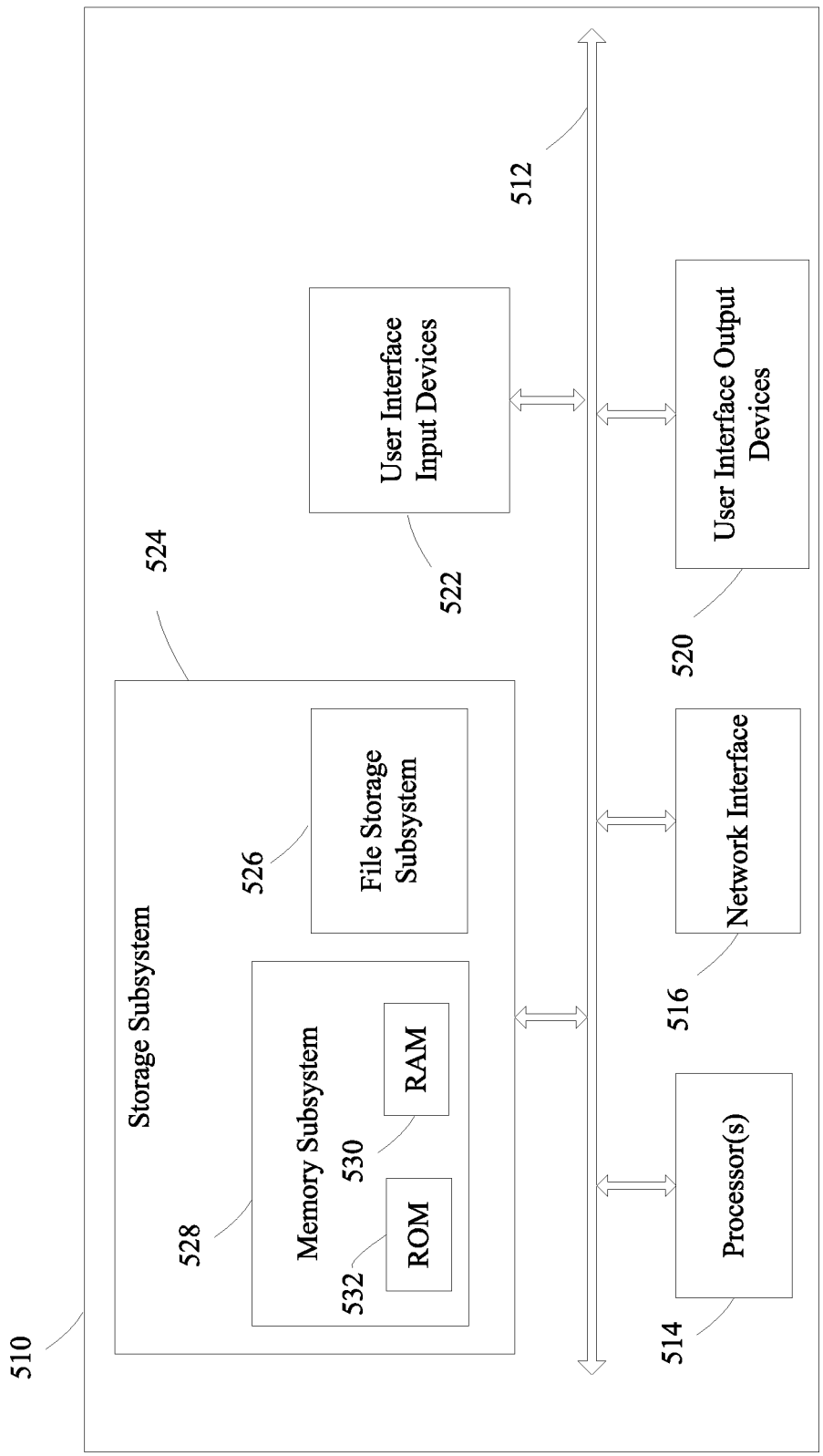
FIG. 5 illustrates a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to identify a task suggestion based on a user query and associate a task with the user based on a selected task suggestion that is associated with the task.

These software modules are generally executed by processor 514 alone or in combination with other processors.

Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 528 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method performed by one or more processors, comprising:
    identifying a query, the query being entered by a user in a graphical interface displayed by a computing device of the user;
    identifying a plurality of suggestions based on similarity between the suggestions and the query, the identified suggestions including at least one task suggestion that is associated with at least one task;
    prior to user input that indicates completion of the query, providing one or more of the suggestions for presentation to the user in the graphical interface, wherein providing the one or more of the suggestions includes providing the task suggestion associated with the at least one task, and wherein providing the task suggestion comprises:
        providing text of the task suggestion, and
        providing, in conjunction with the text of the task suggestion, an indicia that, when selected by the user, causes an association between the user and the at least one task to be stored in one or more databases, wherein the task suggestion is provided visually separate from any other provided of the suggestions;
    monitoring for a user selection of the text or the indicia;
    wherein in response to the user selection being of the text of the task suggestion, submitting, to a search engine, the text as a search query without causing the association between the user and the at least one task to be stored; and
    wherein in response to the user selection being of the indicia of the task suggestion, populating, in a separate application of the computing device, task information of the task.

2. The method of claim 1, further comprising:
    identifying a task type of the at least one task of the task suggestion; and
    selecting the indicia based on the task type.

3. The method of claim 2, wherein the indicia is a graphical indication of the task type.

4. The method of claim 1, further comprising determining the at least one task associated with the task suggestion.

5. The method of claim 4, wherein determining the at least one task comprises determining the at least one task based on one or more terms of the task suggestion.

6. The method of claim 4, wherein determining the at least one task comprises determining the at least one task based on user data associated with the user.

7. The method of claim 1, further comprising:
    determining additional information related to completion of the task; and
    storing an additional association between the additional information and the user and the at least one task.

8. The method of claim 7, further comprising identifying a task type for the task, wherein determining the additional information related to completion of the task is based on the identified task type.

9. The method of claim 7, wherein determining the additional information related to completion of the task comprises determining the additional information based on one or more e-mails of the user.

10. A system comprising:
    memory storing instructions;
    one or more processors operable to execute the instructions to:
        identify a query, the query being entered by a user in a graphical interface displayed by a computing device of the user;
        identify a plurality of suggestions based on similarity between the suggestions and the query, the identified suggestions including at least one task suggestion that is associated with at least one task;
        prior to user input that indicates completion of the query, provide one or more of the suggestions for presentation to the user in the graphical interface, wherein providing the one or more of the suggestions includes providing the task suggestion associated with the at least one task, and wherein in providing the task suggestion one or more of the processors are to:

provide text of the task suggestion, and provide, in conjunction with the text of the task suggestion, an indicia that, when selected by the user, causes an association between the user and the at least one task to be stored in one or more databases, wherein the task suggestion is provided visually separate from any other provided of the suggestions;

monitor for a user selection of the text or the indicia;

wherein in response to the user selection being of the text of the task suggestion, submit, to a search engine, the text as a search query without causing the association between the user and the at least one task to be stored; and wherein in response to the user selection being of the indicia of the task suggestion, populate, in a separate application of the computing device, task information of the task.

11. The system of claim 10, wherein one or more of the processors are further operable to execute the instructions to:

identify a task type of the at least one task of the task suggestion; and select the indicia based on the task type.

12. The system of claim 11, wherein the indicia is a graphical indication of the task type.

13. The system of claim 11, wherein one or more of the processors are further operable to execute the instructions to determine the at least one task associated with the task suggestion.

14. The system of claim 11, wherein one or more of the processors are further operable to execute the instructions to:

determine additional information related to completion of the task; and store an additional association between the additional information and the user and the at least one task.

15. The system of claim 14, wherein one or more of the processors are further operable to execute the instructions to identify a task type for the task, and wherein determining the additional information related to completion of the task is based on the identified task type.

16. The system of claim 14, wherein in determining the additional information related to completion of the task one or more of the processors are to determine the additional information based on one or more e-mails of the user.

* * * * *